United States Patent [19]

Zohn et al.

[11] 4,120,371
[45] Oct. 17, 1978

[54] LOAD HOLDER EXTENSION FOR BEAM BALANCE SCALES

[75] Inventors: Robert Allen Zohn; Carole Zohn, both of Great Neck, N.Y.

[73] Assignee: Correct Count Company Inc., Mineola, N.Y.

[21] Appl. No.: 855,717

[22] Filed: Nov. 29, 1977

[51] Int. Cl.² .......................................... G01G 21/22
[52] U.S. Cl. ................................................ 177/262
[58] Field of Search ...................... 177/246, 262, 263

[56] References Cited

U.S. PATENT DOCUMENTS

| 25,203 | 8/1859 | Kelly | 177/262 |
|---|---|---|---|
| 1,667,891 | 5/1928 | Hapgood | 177/262 |
| 1,685,793 | 10/1928 | Wetzel | 177/262 |

FOREIGN PATENT DOCUMENTS

| 649,896 | 10/1962 | Canada | 177/262 |
|---|---|---|---|
| 109,660 | 2/1944 | Sweden | 177/262 |

Primary Examiner—George H. Miller, Jr.
Attorney, Agent, or Firm—Joel Halpern

[57] ABSTRACT

An extension platform for a beam balance scale and the combination of such a platform with a beam balance scale. The extension platform includes a generally planar upper surface and a lower surface having a grid of reinforcing ribs formed thereon subdividing the lower surface into a plurality of compartments. The lower surface is given a seating projection which depends therefrom and is configured and dimensioned to snap in place over the peripheral rim of the load-receiving platform of a beam balance scale of preselected size. The beam balance scale is thus rendered more accurate when used in the weighing of fibrous low bulk density materials.

16 Claims, 5 Drawing Figures

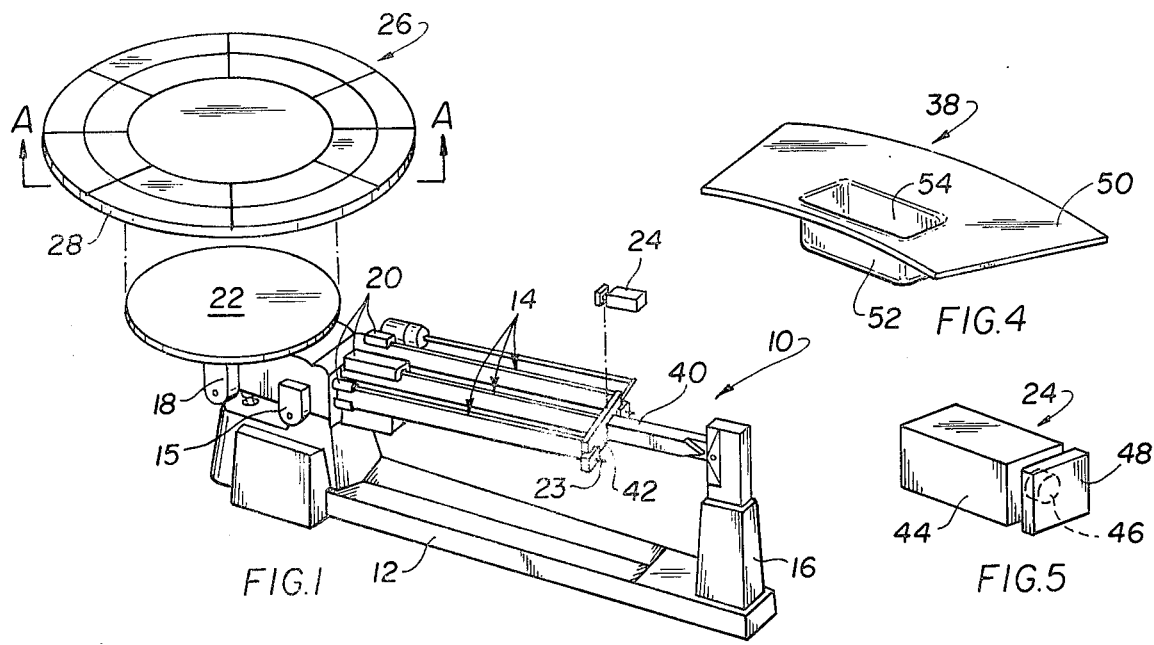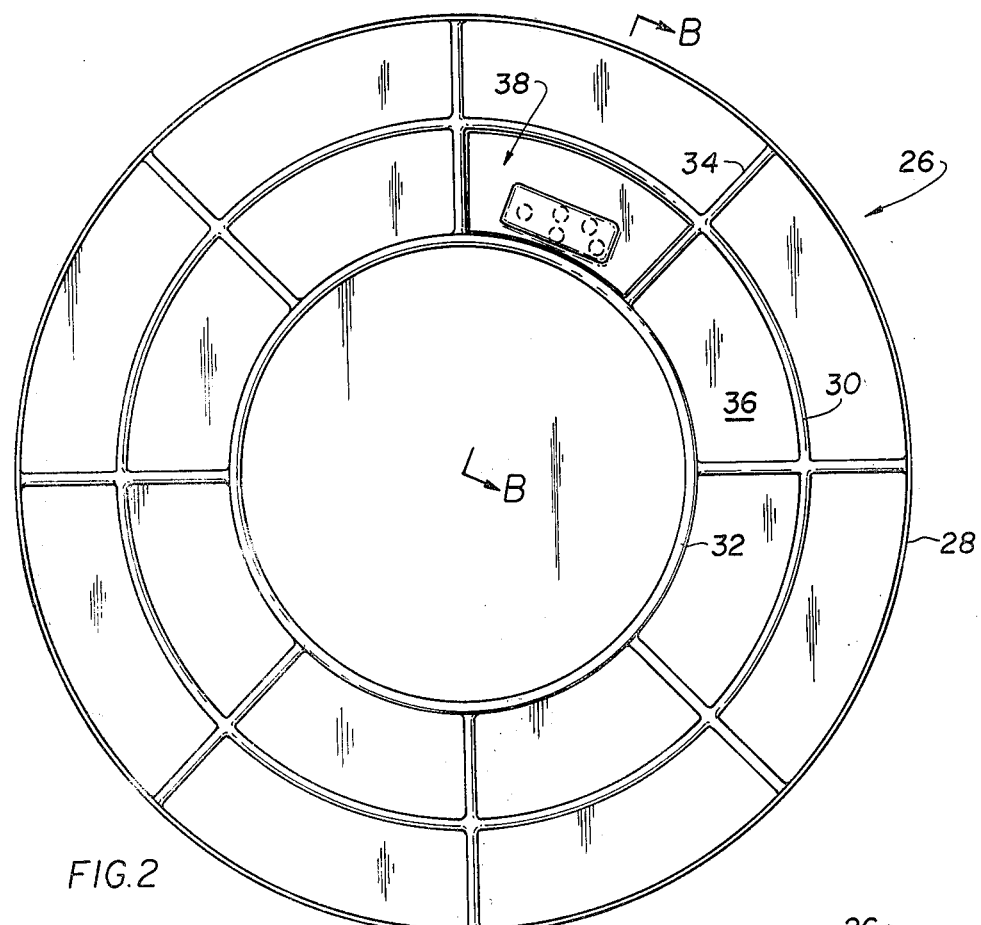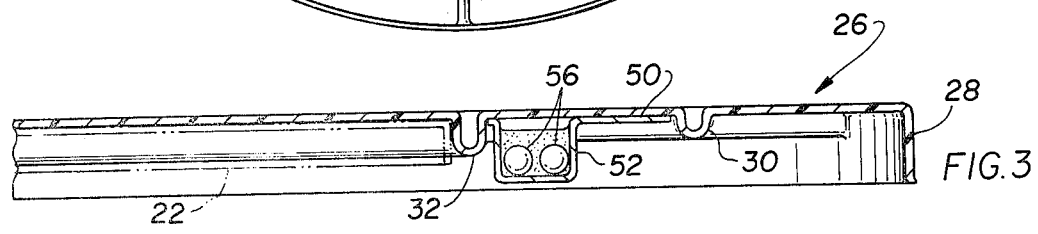

LOAD HOLDER EXTENSION FOR BEAM BALANCE SCALES

BACKGROUND OF THE INVENTION

The present invention relates to weighing scales and more particularly to scales of the beam balance type in which a scale beam is pivotably supported on a beam fulcrum post and a load-receiving platform and support therefor are pivotably carried by the scale beam or beams.

Weighing scales of the type to which this invention pertains are customarily constructed to possess a predetermined load capacity and are initially calibrated to zero through the use of counterweights which are suspended on the beam at some convenient and effective location. The load-receiving area of the weighing platform is given a predetermined and fixed shape and value. Although such scales can obviously be employed in the weighing of particulate and fibrous materials it has been found that when fibrous materials of low bulk density are weighed frequently strands or fibers drape over the periphery of the weighing platform and adversely affect the accuracy of the measurement. To the contrary, relatively high bulk density material present little or no problem in terms of the accuracy of the measurement since the center of gravity of such materials coincides substantially with the vertical or longitudinal axis of the weighing platform and its support as well as with the pivot axis on the scale beam. It is not possible with existing scales to modify the size of the weighing platform to eliminate the draping over of the low bulk density fibrous materials without dissassembly of the scale and replacement of the weighing platform. In such event it would also be necessary to recalibrate the scale to zero thereby requiring that the scale be shipped back to the manufacturer and entailing additional time and expense.

SUMMARY OF THE INVENTION

It is one object of this invention to provide an extension platform for a weighing scale which can be mounted atop the existing scale platform and which will increase the accuracy of the scale when used in the weighing of low bulk density fibrous materials.

It is another objcet of the invention to provide an extension platform for a weighing scale of the character stated which can be installed on the scale without the need to recalibrate the scale to zero.

It is yet another object of this invention to provide the combination of a weighing scale of the beam balance type and an extension platform releasably mountable on the original weighing platform whereby to assure the accuracy of the scale even in connection with the weighing of low bulk density fibrous materials and obviating the need for factory recalibration of the scale to zero.

Other objects and advantages of the invention will become readily apparent to persons versed in the art to which the invention pertains from the ensuing description of the invention.

According to the present invention there is provided an extension platform for a beam balance scale comprising a generally planar upper surface, a lower surface having a grid of reinforcing ribs formed thereon subdividing the lower surface into a plurality of compartments, and a seating projection depending from the lower surface configured and dimensioned to snap over the peripheral rim of the weighing platform of a beam balance scale of preselected size to be mounted thereon releasably.

According to the present invention there is also provided the combination of a beam balance scale having a base, a beam fulcrum post carried on the base, at least one beam balance mounted pivotably on said post, and a load-receiving weighing platform and support therefor pivotably carried by the beam balance and an extension platform for the weighing platform aforestated, such extension platform comprising a generally planar upper surface, a lower surface having a grid of reinforcing ribs formed thereon subdividing the lower surface into a plurality of comparyments, and a seating projection depending from the lower surface configured and dimensioned to snap over the peripheral rim of the weighing platform of the scale so as to releasably mount the extension platform thereon.

BRIEF DESCRIPTION OF THE DRAWINGS

In order that the invention may be more fully comprehended it will now be described, by way of example, with reference to the accompanying drawings in which:

FIG. 1 is a perspective view of a beam balance weighing scale and an extension platform therefor shown in position to be mounted upon the weighing platform of the scale;

FIG. 2 is a bottom plan view of the extension platform shown in FIG. 1;

FIG. 3 is an end elevational view, in cross-section, of the extension platform shown in FIG. 2 taken along line B—B thereof;

FIG. 4 is a perspective view of a balance weight to be used in conjunction with the extension platform of FIG. 2; and FIG. 5 is a perspective view of a counterweight to be used with the scale shown in FIG. 1.

DETAILED DESCRIPTION OF THE INVENTION

Referring to the drawings there is shown generally, as indicated by reference numeral 10, a weighing scale of the beam balance type. The scale includes a base 12 at one end of which a pedestal 16 projects upwardly and is provided with a reference mark to indicate the zero state of the scale. One or more beam balances 14 are mounted pivotably upon a fulcrum post 15, and a slidable weight 20 is carried by each of such beams as is known. In a triple beam scale one of the beams provides a range of up to 10 grams, a second of the beams up to 100 grams, and the third beam up to 500 grams. It will be understood, of course, that the capacity of the individual beams and their associated slidable weights as well as the total capacity of the scale is predetermined.

There is mounted pivotably on the beams, such as on an end extension thereof opposed to the end terminating adjacent pedestal 16, a support member 18 surmounted by a load-receiving platform 22. One or more post elements 23 may be provided on a header member 42 common to the beams 14, such post elements being able to accomodate counterweights thereon (not shown). The scale construction so described is conventional. The platform 22 is not readily removable for any purpose and, as will be appreciated, has pre-established dimensions so as to present an upper load-receiving area of predetermined size. One of the inherent deficiencies of scales of this type is the susceptibility to error when the weighing platform is subjected to a tilting action due to an offset in the load resting upon the platform. Because of the limited area available for deposit of fibrous low bulk density materials the platform is subjected to such eccentric loading conditions.

The improvement provided by this invention stems from the use of an extension platform 26 in cooperation with a counterweight 24 configured and dimensioned to be carried upon header member 25. The extension platform is desirably disc-shaped with an upper generally planer surface 27, a peripherally extending stiffening rim or flange 28, and an under or lower surface 31 which is subdivided into a plurality of compartments 36 by a grid of reinforcing ribs comprising one or more circular ribs 30, an inner seating projection 32 and radially extending ribs 34. It will be observed that the outer extremities of such radial ribs terminate in stiffening rim 28 to thereby afford optimum strength for the extension platform. The platform is shown as being disc-shaped; however, it will be understood that other shapes may be employed provided they are symmetrical so as not to create any unbalanced moment forces which would produce the imbalance discussed above and thereby contribute to the inaccuracy of the scale.

As may be seen from FIGS. 2, 3 and 4 of the drawings there is provided a balance weight 38 of such configuration and dimensions that it is positionable within a selected one of compartments 36. Preferably the balance weight is given overall dimensions such that it fits snugly within the selected compartment for securement therewithin as will be described. The balance weight is a member having a generally planar peripherally extending marginal section 50 which, as aforestated, is configured to complement the configuration of the compartments so as to facilitate positioning of the balance weight therewithin. A chamber or pocket 54 is formed inwardly of the marginal section 50 and is defined by a plurality of side walls 52 which are integral with the project substantially perpendicularly from the marginal section. In its preferred form the balance weight and the extension platform are molded as one piece components from the same type of synthetic plastics material, the reinforcing ribs being formed in situ during the molding step. A quantity of pellet-like elements 56 are positioned within the pocket of the balance weight during the zero calibrating procedure to be described. Once the specific compartment is selected for positioning of the balance weight, and the correct number of pellets placed within the pocket of the balance weight, the balance weight is mounted within the compartment and permanently secured therewithin in any conventional manner. Thus, a suitable adhesive may be employed or the marginal section may be heat-sealed to the overlying surface of the platform. FIG. 3 illustrates a portion of the platform with the balance weight in position in the compartment formed between a pair of adjacent radial ribs 34 and between seating projection 32 and outer concentric reinforcing rib 30.

Referring to FIG. 1 it will be seen that the ends of the beams 14 terminate in common header 42 and that a common beam extension 40 continues outwardly to terminate adjacent pedestal 16 with its zero reference marking constituted by the arrowhead in the upper region of the pedestal. In initially calibrating the scale for use with the extension platform counterweight 24 is mounted atop header 42 such that its elongated body 44 rests upon beam extension 40 and its end retainer head is disposed on the opposite side of header 42. A slot or recess is formed between the retainer head and body of the counterweight and the head and body are connected by a shank 46 which extends integrally therebetween. Once the counterweight is so positioned the extension platform 26 is placed upon weighing platform 22 of the scale and snapped in releasable mounted relation thereon. The platform is oriented azimuthally such that one of its compartments 36 straddles the longitudinal axis of the scale. The balance weight is placed upon the upper surface of the platform 26 in registry with the thus oriented compartment, and a sufficient quantity of pellets or like elements 56 are inserted into the pocket 54 of the balance weight until observation of the outer end of the beam indicates (in cooperation with the zero reference marking on pedestal 16) that the scale has been calibrated to zero. The balance weight is thereafter mounted within the compartment 36 so selected and secured permanently therewithin as described above. Thus, whenever the extension platform is to be employed it simply is positioned on the weighing platform 22 of the scale with the compartment 36 having the balance weight 38 therein oriented across the longitudinal axis of the scale as described and outwardly of support member 18. There is no need to effect any further calibration of the scale.

It scales of the type described there is conventionally provided a check rod which is connected pivotably between the depending support for the weighing platform and the lower section of the beam fulcrum post so as to form a parallelogram linkage. The provision of the extension platform with its balance weight and the counterweight for the end of the beam, i.e. counterweight 24, is believed to minimize any moment forces imposed on such linkage and thereby reduce the inherent inaccuracy of the scale when low bulk density fibrous materials are to be weighed which would ordinarily extend beyond the peripheral edge of the permanent platform of the scale, such overhang tending to result in an inaccurate reading.

Although the invention has been described in specific terms it will be understood that various changes may be made in size, shape, materials and in the arrangement of the components without departing from the spirit and scope of the invention as claimed.

Having thus set forth the nature of the invention, what is claimed herein is:

1. An extension platform for a beam balance weighing scale comprising:
   a generally planar upper surface;
   a lower surface provided with a grid of reinforcing ribs thereon subdividing said lower surface into a plurality of compartments;
   and a seating projection depending from said lower surface configured and dimensioned for seating about the peripheral edge of the weighing platform of a beam balance scale of predetermined size.

2. An extension platform according to claim 1, wherein said seating projection comprises one of said reinforcing ribs.

3. An extension platform according to claim 1, wherein said seating projection comprises a central ring and said grid of reinforcing ribs includes at least one rib concentric with and radially outwardly of said central ring and a plurality of circumferentially spaced radial ribs which extend outwardly from said central ring and terminate adjacent the outer periphery of the platform.

4. An extension platform according to claim 3, wherein a depending lip is provided at the outer periphery thereof and said radial ribs terminate at their respective outer extremities in said peripheral lip.

5. An extension platform according to claim 3 which is disc-shaped.

6. An extension platform according to claim 1, including a balance weight positionable in a selected one of said compartments.

7. An extension platform according to claim 6, wherein said balance weight comprises a member having a generally planar peripherally extending marginal section configured and dimensioned to fit snugly within one of said compartments, said member including a chamber formed inwardly of said marginal section and defined by side walls integral with and projecting substantially perpendicularly from said marginal section.

8. An extension platform according to claim 7, wherein a plurality of pellet-like elements are positioned within the chamber of said balance weight and said balance weight is secured within one of said compartments so as to zero the scale upon which the extension platform is mounted.

9. An extension platform according to claim 8, wherein said balance weight and said extension platform are molded from synthetic plastics material of the same type and said balance weight is joined integrally to said platform so as to seal the pellet-like elements within the chamber of the balance weight.

10. In a beam balance scale having a base, a beam fulcrum post mounted on said base, at least one beam balance mounted pivotably on said beam fulcrum post and a load-receiving platform and support therefor pivotably balanced on said at least one beam the improvement comprising in combination with said scale an extension platform having a generally planar upper surface, a lower surface provided with a grid of reinforcing ribs thereon subdividing said lower surface into a plurality of compartments, and a seating projection depending from said lower surface and configured and dimensioned for seating about the peripheral edge of the weighing platform of a beam balance scale of predetermined size.

11. The combination of a beam balance scale and an extension platform according to claim 10 including a counterweight releasably mountable adjacent the outer extremity of the balance beam symmetrically astride the longitudinal axis of the scale and cooperable with scale zeroing means positionable within a selected one of said extension platform compartments.

12. The combination of claim 11, wherein the seating projection of the extension platform comprises a central ring and said grid of reinforcing ribs includes at least one rib concentric with and radially outwardly of said central ring and a plurality of circumferentially spaced radial ribs which extend outwardly from said central ring and terminate adjacent the outer periphery of the extension platform.

13. The combination of claim 12, including a depending peripherally extending lip on the outer periphery of said extension platform, said radial ribs terminating at their respective outer extremities in said peripheral lip.

14. The combination of claim 11 including a balance weight secured within a selected one of the compartments of said extension platform, said balance weight having a chamber therein containing a predetermined quantity of pellet-like elements, and said counterweight mounted releasably at the outer extremity of the beam balance being determinative of the quantity of pellet-like elements within said chamber of the balance weight.

15. The combination of claim 14, wherein said balance weight comprises a member having a generally planar peripherally extending marginal section configured and dimensioned to fit snugly within the selected-compartment, said chamber being formed inwardly of said marginal section and defined by side walls integral with and projecting substantially perpendicularly from said marginal section.

16. The combination of claim 14, wherein said balance weight and said extension platform are molded from synthetic plastics material of the same type and said balance weight is joined integrally to said extension platform so as to seal the pellet-like elements within the chamber of the balance weight.

* * * * *